United States Patent
Rosenstrom

(10) Patent No.: US 6,298,978 B1
(45) Date of Patent: Oct. 9, 2001

(54) REVERSING NATURAL FREQUENCY VIBRATORY CONVEYOR SYSTEM

(75) Inventor: Bo Richard Rosenstrom, Louisville, KY (US)

(73) Assignee: Carrier Vibrating Equipment, Inc., Louisville, KY (US)

(*) Notice: Subject to any disclaimer, the term of this patent is extended or adjusted under 35 U.S.C. 154(b) by 0 days.

(21) Appl. No.: 09/562,412

(22) Filed: May 1, 2000

(51) Int. Cl.[7] .................................................. B65G 27/32
(52) U.S. Cl. ......................... 198/753; 198/763; 198/766
(58) Field of Search ................................... 198/753, 763, 198/766

(56) References Cited

U.S. PATENT DOCUMENTS

| | | |
|---|---|---|
| 3,528,541 * | 9/1970 | Barton et al. ........................ 198/763 |
| 4,017,060 | 4/1977 | Brander et al. . |
| 4,040,303 | 8/1977 | Makino . |
| 4,162,778 | 7/1979 | Kraft . |
| 4,651,869 * | 3/1987 | Grief ..................................... 198/763 |
| 5,131,525 | 7/1992 | Musschoot . |
| 5,850,906 | 12/1998 | Dean . |
| 5,886,455 | 3/1999 | Tsukimoto . |
| 5,934,446 | 8/1999 | Thomson . |
| 6,029,796 * | 2/2000 | Musschoot ........................... 198/753 |

* cited by examiner

Primary Examiner—Joseph E. Valenza
(74) Attorney, Agent, or Firm—Vance A. Smith; Stites & Harbison

(57) ABSTRACT

The present invention relates to a mechanical vibrating drive system for supplying a consistent, elliptical driving force to a conveyor trough. In a preferred embodiment of the invention, the vibrating conveyor has a set of vertical leaf springs connecting the conveyor trough to a vibratory frame, and a set of horizontal leaf springs connecting the vibratory frame to a stationary frame. The leaf springs amplify the motion initiated by a reversible motor, and the net result is a force output from the drive module that produces a uniform elliptical vibratory motion throughout the length of the conveyor trough. By reversing the motor, a symmetric elliptical motion for moving product in the opposite direction is generated without any further adjustments to the leaf springs.

10 Claims, 4 Drawing Sheets

REVERSING NATURAL FREQUENCY VIBRATORY CONVEYOR SYSTEM

BACKGROUND OF THE INVENTION

This invention is related to a mechanical vibrating drive system for a vibratory conveyor apparatus and, more particularly, to a vibratory conveyor apparatus utilizing the natural frequencies of two spring sets to impart a resultant vibratory drive force to the conveyor apparatus.

There are various vibrating drive systems for controlling the direction and/or speed of product being carried by a vibratory conveyor. The vibrating conveyor apparatus typically includes a trough mounted for vibratory motion, such as provided by a plurality of springs. In general, product is moved along the conveyor trough by a force applied to the trough. The product can be moved along a linear path or along an elliptical path, the path being determined by the force applied to the conveyor trough.

One type of vibrating drive system is a mechanical system utilizing fixed eccentric rotating weights and a phase angle adjustment means. A system of this type is described in detail in U.S. Pat. No. 5,064,053, assigned to the same assignee as the present invention. In the system of the '053 patent, a single rotating shaft bearing an eccentric weight is in a parallel relationship with and positioned between paired additional rotating shafts bearing eccentric weights. The centered single shaft rotates in one direction while the paired shafts rotate in the opposite direction but at the same number of revolutions per minute. When the shafts rotate, the weights impart a force to the conveyor trough which, in turn, causes the product to move along the conveyor. Because the force to move the product is supplied by the eccentric weights, the force generated in insensitive to the product load on the conveyor. Thus, there is a consistent force generated by the drive system regardless of the type or quantity of product that is conveyed. The user can reverse the direction in which the material is being conveyed, but to ensure that product moves along the desired path requires physically changing the positioning of one or more of the eccentric weights and its associated shaft by repositioning the phase angle adjustment means. This change-over requires considerable down time, which is highly undesirable when time is a critical factor in the application.

A second type of vibrating drive system is a mechanical system that uses a reversible motor and dynamic balancers to produce the driving forces. A system of this type is described in U.S. Pat. No. 5,713,457, assigned to General Kinematics Corporation. In the system of the '457 patent, a reversible motor with a rotary output shaft and eccentric weight is mounted near the center of gravity on a conveyor apparatus, and a dynamic balancer is positioned at each end of the conveyor trough. The dynamic balancers are spring and weight systems designed to move the product in an elliptical path as it travels along the conveyor trough. For optimum performance, the dynamic balancers (or absorbers) must be selected such that their natural frequency is just greater than the operational frequency of the system as determined by the frequency of the motor. Maintaining a consistent driving force can be difficult with this type of system because the dynamic balancers are very highly tuned, so small changes in product load or motor speed may affect the performance of the equipment. In particular, the user must be cautious of producing overstrokes that can permanently damage the conveying equipment. As with the eccentric weight systems, the user can reverse the direction of product flow in the system of the '457 patent by reversing the motor. However, because the dynamic balancers are set only for one speed, to make any changes in the system other than reversing the direction of product flow requires that the system be completely modified, which can result in considerable down time.

Eccentric weight systems that include electronic drive capabilities, such as described in U.S. Pat. No. 5,615,763, assigned to the same assignee as the present invention, allow for a rapid change of direction of the product flow. However, such systems are expensive relative to the cost of mechanical systems.

Thus, there is a paramount need for an inexpensive mechanical vibrating drive system that will allow the user to easily and frequently change the direction of flow of the conveyed product without incurring the down time of the system heretofore necessary with prior art mechanical vibrating drive systems. In addition, there is a need for an inexpensive conveying system that will allow the user to convey product along a reversible, symmetric, elliptical path as it travels along the conveyor trough. Further, there is a need for a natural frequency conveyor that will allow product to be conveyed long distances as compared to the prior art feeders which arc limited in length, and for a natural frequency conveyor that preferably will incur relatively low maintenance costs for the user.

SUMMARY OF THE INVENTION

The present invention relates to a mechanical vibrating drive system for supplying a consistent, elliptical driving force to a conveyor trough. The mechanism for supplying the force to vibrate the trough includes a set of essentially vertical springs which connect the conveyor trough to a vibrating frame and provides a horizontal vibratory motion to the trough, and a set of essentially horizontal springs which connect the vibrating frame to a stationary frame and provides a vertical vibratory motion to the vibrating frame. The vibrating frame holds a rotating eccentric crank arm drive, having a shaft with a plurality of eccentric cuts, and associated crank arms. A crank arm from the drive is indirectly connected to the conveyor trough causing the trough to vibrate as the shaft rotates. A second crank arm in indirectly connected to the vibrating frame causing the frame to vibrate. The amplitude of vibration in the vertical and horizontal directions is determined by the drive shaft eccentrics selected. A standard reversing type motor is used to drive the shaft in either a forward or a reverse direction.

In a preferred embodiment of the invention, vertical and horizontal leaf springs provide the vibratory motion to the trough, and the drive shaft eccentrics are selected so that the magnitude of the major (horizontal) axis is approximately four times the magnitude of the minor (vertical) axis. The net result is a force output from the drive module that produces a uniform elliptical vibratory motion throughout the length of the conveyor trough. By reversing the motor, a symmetric elliptical motion for moving product in the opposite direction is generated without any further adjustments to the leaf springs or shafts.

DETAILED DESCRIPTION OF THE DRAWINGS

DETAILED DESCRIPTION OF THE PREFERRED EMBODIMENT

Figure 1:
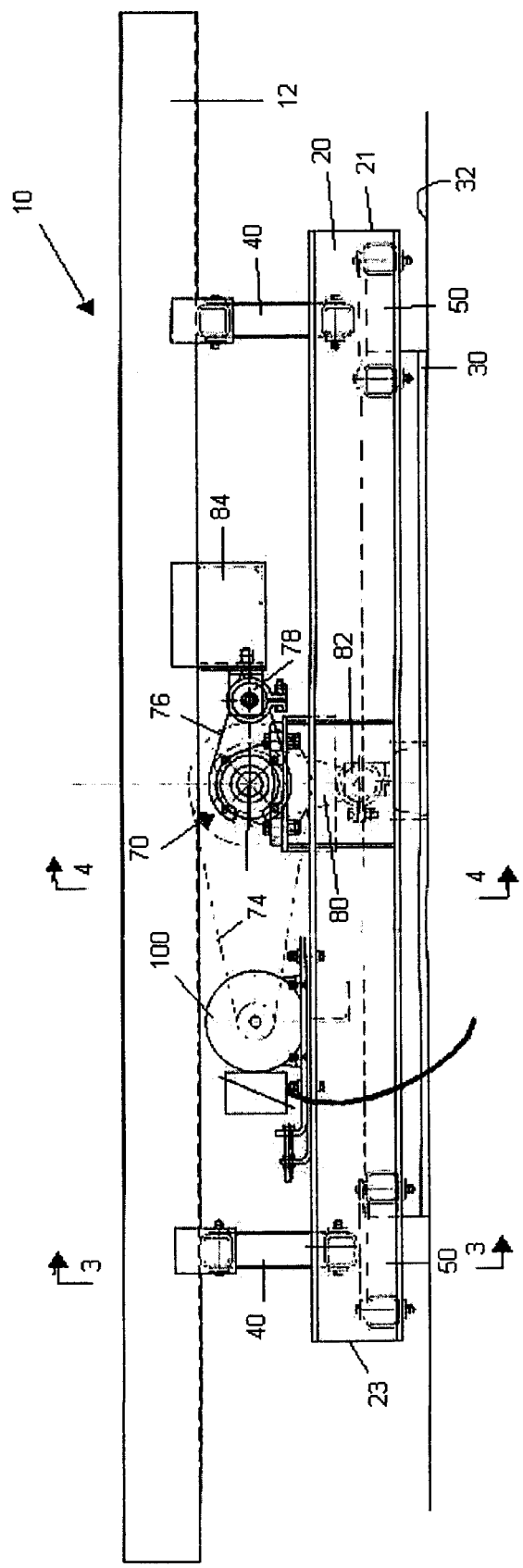
FIG. 1 is a schematic of an embodiment of the present invention showing a side view of a natural frequency vibratory conveyor apparatus having leaf spring systems to impart a vibratory motion to the conveying trough.

The conveyor system depicted in the various Figures is a multiple spring set system driven by a single motor and is selected solely for the purposes of illustrating the invention. Other and different eccentric shaft conveyor systems may utilize the inventive features described herein as well. Further, a plurality of systems can be utilized in a series along a single long conveyor.

Reference is first made to FIGS. 1–4 in which the two-way vibratory conveyor system constructed in accordance with the present invention is generally noted by the character numeral 10. The system of 10 has as major components a vibrating trough or pan 12; a vibrating frame 20; a stationary frame 30; a pair of vertical leaf spring sets 40; a set of horizontal leaf springs 50; and a rotating eccentric crank arm drive system 70. The stationary frame 30 rests on a stationary support 32, such as a floor, and can be affixed to the support 32 by any suitable means, such as by using bolts or anchors. The vibrating frame 20 is connected to the stationary frame 30 with the horizontal leaf springs 50, which run essentially parallel to the vibrating frame 20, and are mounted toward the ends 21, 23 of the frame 20. The vibrating pan 12 runs essentially parallel to the vibrating frame 20 and is connected to the vibrating frame 20 by the vertical leaf spring sets 40, which are essentially perpendicular to the pan 12. The rotating eccentric crank arm drive system 70 is attached to the vibrating frame 20 between the vertical leaf spring sets 40. Alternatively, the vertical leaf springs 40 may be replaced with vertical coil springs, or the horizontal leaf springs 50 may be replaced by horizontal coil springs, or both sets of leaf springs 40, 50 may be replaced by coil springs (not shown).

Figure 2:
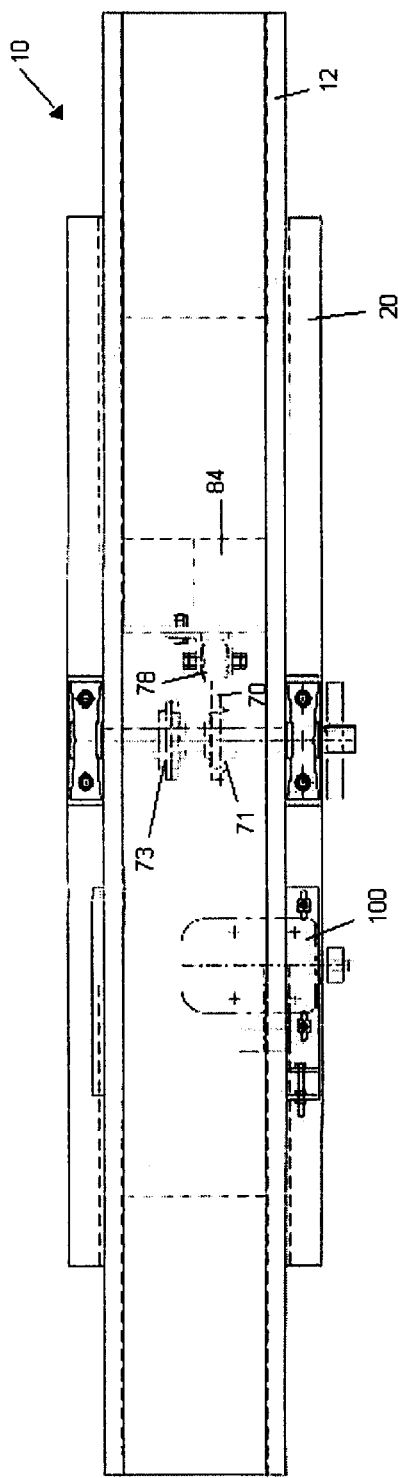
FIG. 2 is top view of the vibratory apparatus of FIG. 1.
Figure 2A:
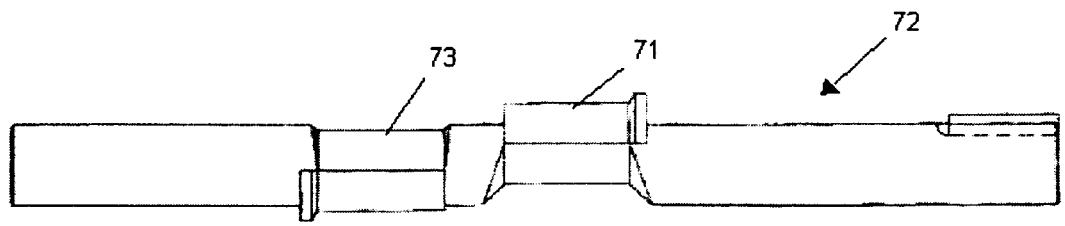
FIG. 2A is a side view of the eccentric bearing shaft of the apparatus of FIG. 1.
Figure 2B:
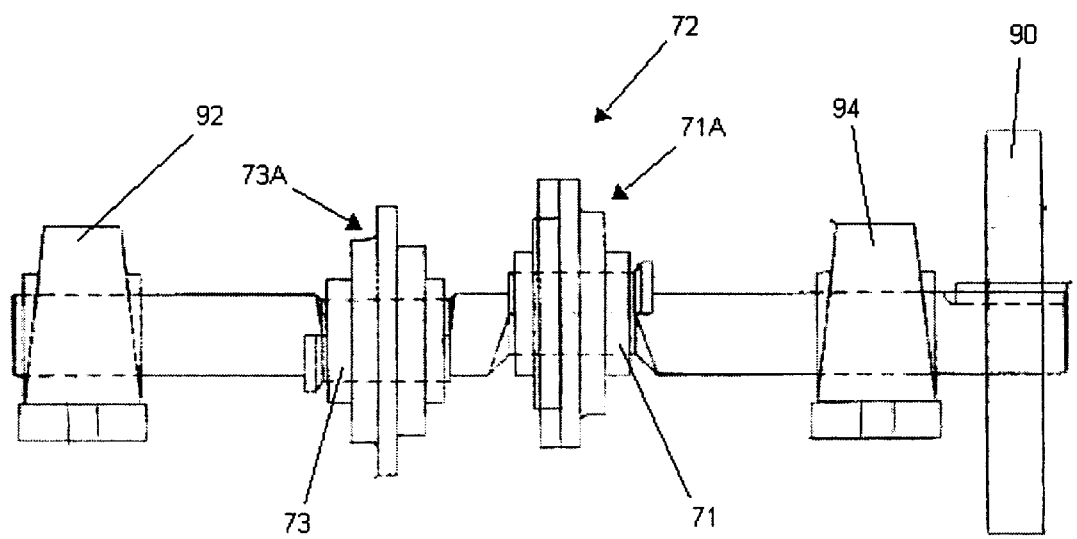
FIG. 2B is a side view of the eccentric bearing shaft of the FIG. 2A fitted with two base bearings and two drive arm bearings.
Figure 3:
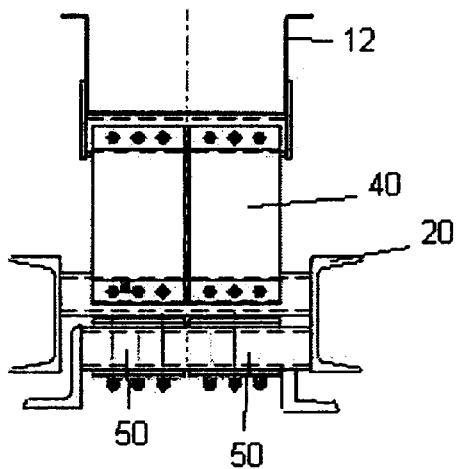
FIG. 3 is cross-sectional view of the vibratory apparatus of FIG. 1 taken along line 3—3 showing the respective location of the vertical leaf springs and the coil springs.
Figure 4:
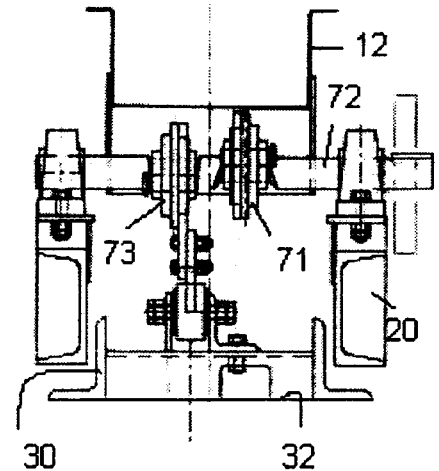
FIG. 4 is a cross-sectional view of the vibratory apparatus of FIG. 1 taken along line 4—4 showing the respective location of the eccentric cuts on the shaft, and the second crank arm shaft.

As shown in FIGS. 1–3, the rotating eccentric crank arm drive system 70 includes a single reversible motor 100 that is connected to an eccentric bearing shaft 72 via a belt 74 attached to a belt sheave 90. As shown in FIGS. 2A and 2B, cut into the shaft 72 are two eccentric cuts 71, 73, each of which hold a drive arm bearing 71A, 73A, respectively; and the shaft 72 is mounted on the vibrating frame 20 by a pair of base bearings 92, 94. One of the drive arm bearings 71A is connected via a crank arm 76 to a steel arm with a rubber bushing 78 which imparts motion, through a pan drive connection 84, to the vibrating pan 12; and the other bearing 73A is connected via a second crank arm 80 to a steel arm bushing and drive clip 82 connected to the vibrating frame 20. Optionally, other drive springs may be used in place of the bushings 78, 82, and additional cuts and drive arms may be added to the shaft 72 if so warranted by the width and length of the conveyor trough 12. As the motor 100 rotates, the belt 74 drives the eccentric bearing shaft 72 which in turn drives the crank arms 76, 80, and thereby the bushings 78, 82, causing the vibrating pan 12 and the vibrating frame 20 to move. The vertical leaf springs 40 and the horizontal leaf springs 50 then amplify the motion initiated by the motor 100, with the vertical leaf springs 40 causing the vibrating pan 12 to move horizontally and the horizontal leaf springs 50 causing the vibrating frame 20 to move vertically.

The eccentric bearing shaft 72 creates a driving force having a vertical and a horizontal component, directed toward the vibrating pan 12. These force components are then amplified by the spring sets 40, 50. The net driving force, then, is the summation of the individual force components, and this net driving force is transferred to the pan 12 which, in turn, transfers the force to the product on the pan 12 causing the product to move. When the net driving forces are essentially 90° out of phase—i.e. when the horizontal vibration is at its peak the vertical vibration is at it neutral point, and vice versa—the vibrating pan 12 has an elliptical motion thereby moving the product along the pan 12 with a shuffling linear motion. The proper combination of the elliptical stroke with conveying speed produces an extremely rapid conveying action which is gentle to the product, thus minimizing product degradation, and is relatively quiet. When the net driving forces are in phase, the product moves in the vibrating pan 12 by following a linear motion. In the preferred embodiment, the bearing shaft 72 and the spring sets 40, 50 are selected such that net driving forces are out of phase, and the eccentric magnitude of the major axis is approximately four times the minor axis.

The product can be moved in the opposite or reverse direction on the pan 12 by simply reversing the motor 100, without any further adjustments to the spring sets 40, 50, or to the eccentric bearing shaft 72. When the motor 100 is reversed, the pan 12 is moved along an essentially identical elliptical path as when the motor 100 operates in the forward direction, except the product moves in the opposite direction. That is, if as the motor 100 operates in the forward direction, the pan 12 moves counterclockwise about the elliptical path, then as the motor 100 operates in the reverse direction, the pan 12 moves clockwise about the elliptical path. By reversing the rotational direction of the motor 100, the product effectively moves in the opposite direction along the conveyor pan 12.

Figure 5:
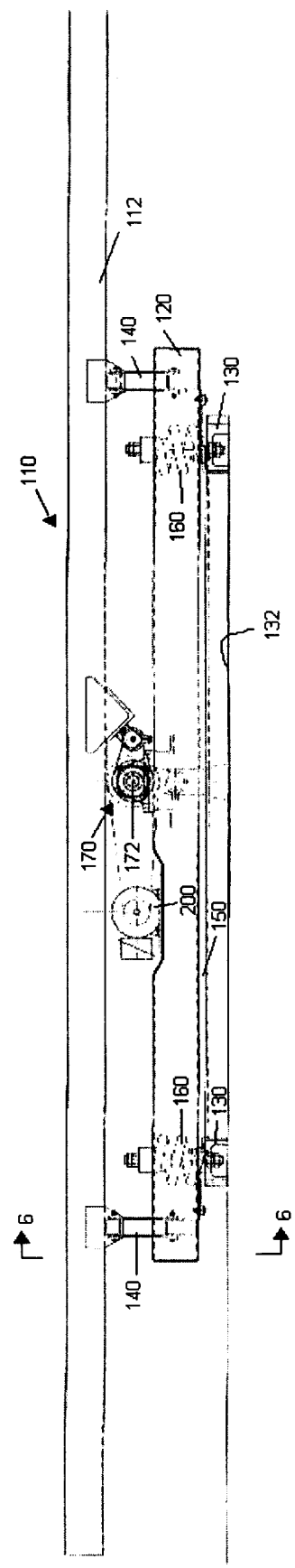
FIG. 5 is a schematic of an alternative embodiment of the present invention showing a side view of a natural frequency vibratory conveyor apparatus having leaf spring systems to impart a vibratory motion to the conveying trough.
Figure 6:
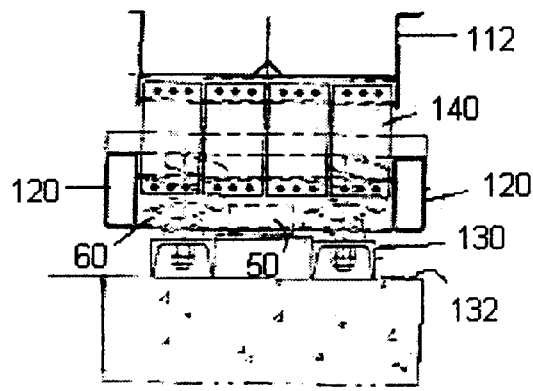
FIG. 6 is cross-sectional of the vibratory apparatus of FIG. 5 taken along line 6—6 showing the respective location of the vertical leaf springs and the coil springs.

FIGS. 5 and 6 show an alternative embodiment 110 of the two-way vibratory conveyor system. The system of 110 has as major components a vibrating pan 112; a vibrating frame 120; a stationary frame 130; a plurality of vertical leaf spring sets 140; a horizontal leaf spring set 150; a pair of vertical coil spring sets 160; and a rotating eccentric crank arm drive system 170, including a drive shaft 172 with eccentric cuts. Similar to the embodiment 10 of FIG. 1, the stationary frame 130 rests on a stationary support 132, such as a floor, and can be affixed to the support 132 by any suitable means, such as by using bolts or anchors. The vibrating frame 120 is connected to the stationary frame 130 by the horizontal leaf springs 150, which are essentially parallel to the support 132 and which are mounted essentially perpendicular to the length of the vibrating frame 120, and with the vertical coil spring sets 160. The vibrating pan 112 is connected to the vibrating frame 120 by the vertical leaf spring sets 140, which are essentially perpendicular to the pan 112. The rotating eccentric crank arm drive system 170 is attached to the vibrating frame 120 between the vertical leaf spring sets 140. Alternatively, either vertical or horizontal coil springs may be used in place of the respective leaf springs 140, 150 (not shown), or both the vertical and horizontal leaf springs 140, 150 may be replaced by coil springs.

As shown in FIG. 5, the rotating eccentric crank arm drive system 170 is essentially identical to the eccentric crank arm drive system 70 of FIG. 1, and functions to impart motion to the vibrating pan 112 as described previously herein. Similar to the embodiment of FIG. 1, the vertical leaf springs 140 and the horizontal leaf springs 150 then amplify the motion initiated by the motor 200 of the rotating eccentric crank arm drive system 170, with the vertical leaf springs 140 amplifying the horizontal motion of the vibrating pan 112, and the horizontal leaf springs 150 amplifying the vertical motion. In the preferred embodiment, the eccentric bearing drive shaft 172 and the spring sets 140, 150 are selected and oriented on the shaft 172 such that net driving forces are out of phase, and the magnitude of the major axis is approximately four times the minor axis; and the product can be moved in the opposite or reverse direction on the pan 112 by simply reversing the motor 200, without any further adjustments to the system 110.

It is understood that, in light of a reading of the foregoing description and drawings, those with ordinary skill in the art will be able to make changes and modifications to the present invention without departing from the spirit or scope of the invention, as defined herein.

What is claimed is:

1. A vibrating conveyor, powered by a reversible motor, for moving a conveyor trough in a first direction along a non-linear path when said motor is operating in the forward direction, and for moving said conveyor trough in a second direction along an essentially symmetric non-linear path when said motor is operating in the reverse direction, said conveyor comprising
    a conveying trough for moving product through vibratory motion imparted to said trough;
    a vibratory frame;
    a stationary frame;
    a plurality of spring members mounted essentially vertical relative to said trough and connecting said trough to said vibratory frame;
    a plurality of spring members mounted essentially horizontal relative to said trough and connecting said vibratory frame to said stationary frame; and
    a vibrating assembly for imparting vibratory motion to said trough and to said vibratory frame, said assembly including a reversible motor.

2. A vibrating conveyor apparatus as recited in claim 1 wherein said vertical springs are leaf springs.

3. A vibrating conveyor apparatus as recited in claim 1 wherein said horizontal springs are leaf springs.

4. A vibrating conveyor apparatus as recited in claim 1 wherein said vertical springs are coil springs.

5. A vibrating conveyor apparatus as recited in claim 1 wherein said horizontal springs are coil springs.

6. A vibrating conveyor apparatus as recited in claim 1 further including at least one coil spring.

7. A vibrating conveyor apparatus as recited in claim 6 wherein said coil spring connects said vibrating frame to said stationary frame.

8. A vibrating conveyor, powered by a reversible motor, for moving a conveyor trough in a first direction along a non-linear path when said motor is operating in the forward direction, and for moving said conveyor trough in a second direction along an essentially symmetric non-linear path when said motor is operating in the reverse direction, said conveyor comprising
    a conveying trough for moving product through vibratory motion imparted to said trough;
    a vibratory frame, connected said to trough by a plurality of spring members mounted essentially vertical to said trough;
    a stationary frame, connected to said vibratory frame by a plurality of spring members which lie essentially horizontal relative to said trough; and
    a vibrating assembly for imparting vibratory motion to said trough and to said vibratory frame, said assembly including a reversible motor.

9. A vibrating conveyor apparatus as recited in claim 8 wherein said vertical springs are leaf springs, and said horizontal springs are leaf springs.

10. A vibrating conveyor apparatus as recited in claim 9 further including at least one coil spring connects said vibrating frame to said stationary frame.

* * * * *